E. Soper.
Mechanical Movement.

No. 73401          Patented Jan. 14, 1868.

WITNESSES
                                                      INVENTOR
                                                      E. Soper
                                                      per
                                                      Attorneys

United States Patent Office

EPHRAIM SOPER, OF NEW YORK, N. Y.

Letters Patent No. 73,401, dated January 14, 1868.

---

IMPROVEMENT IN MECHANICAL MOVEMENTS.

---

The Schedule referred to in these Letters Patent and making part of the same.

---

TO ALL WHOM IT MAY CONCERN:

Be it known that I, EPHRAIM SOPER, of the city, county, and State of New York, have invented a new and improved Mechanical Movement; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new manner of arranging the crank of machinery, and consists in fitting gear-wheels to the crank so as to obtain from a stationary pinion, mounted on the wrist-pin, additional revolutions or parts of revolutions for the shaft.

A gear-wheel is mounted on the shaft, and another on the wrist-pin, the crank itself turning loose on the shaft. As the crank is being turned, the wheel, mounted on the wrist-pin, is held on the same, so that it can only turn around the axis of the shaft and not around its own axis. The wheel on the shaft thus receives one revolution by the rotation of the crank, which crank is actually composed of the two gear-wheels; but the wheel on the shaft receives an additional revolution or part of a revolution, by the action of the outer or wrist-wheel upon the inner or shaft-wheel. If the two wheels were of equal diameters, the shaft would be revolved twice during one revolution of the crank, as it receives one revolution from the simple rotation of the crank, and one more by the motion of the wrist-wheel, around the shaft-wheel, whereby the latter is caused to turn once around its axis, so as to follow the teeth of the outer wheel.

If the wrist-wheel is smaller than the shaft-wheel, the latter will, during one revolution of the crank, revolve once and a fraction, which is equal to the fraction obtained by dividing the diameter of the wrist-wheel by that of the shaft-wheel. If the wrist-wheel is larger than the shaft-wheel, the shaft will revolve so much oftener than once as the diameter of the shaft-wheel is contained in that of the wrist-wheel. And thus, by means of this invention, the shaft will revolve quicker than the crank, whatever the respective diameters of the gear-wheels may be.

The invention will be particularly useful for sewing-machines, and other similar small machines, but may also be used advantageously for large engines. The dead-centre will be successfully overcome as the increased momentum of the shaft tends to aid the crank in its motion.

Figure 1:
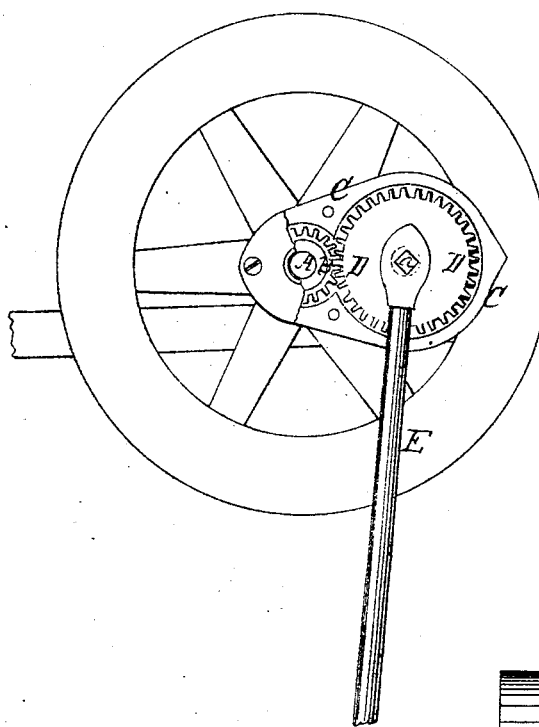
Figures 1 and 2 represent end elevations of my invention.
Figure 3:
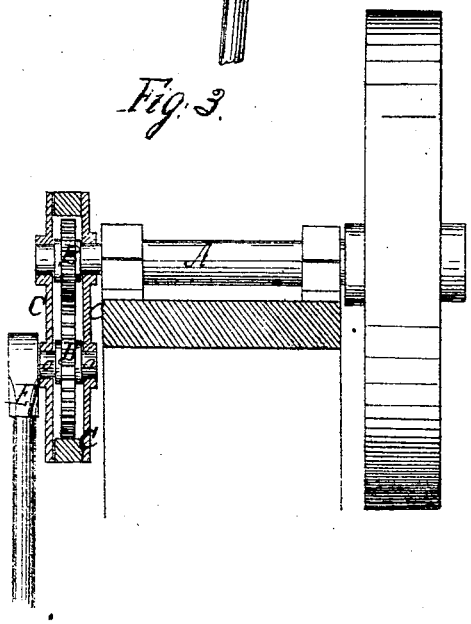
Figures 3 and 4 are side views, partly in section, of the same.

A represents a shaft; B is a gear-wheel, mounted on the same; C is a plate or bar, projecting from the shaft attached to the same, in such a manner that it can revolve freely around it. Into the outer part of the plate C, is fitted a pin, $a$, upon which is mounted a gear-wheel, D, as shown in fig. 1, the pin $a$ and its wheel turning freely in the plate. To the pin $a$, which thus forms the wrist-pin of the crank, is attached the connecting-rod E, as shown. The wheels D and B mesh into each other, and thus actually form the crank, the plate C only serving to support the pin $a$. In figs. 1 and 3 the wrist-wheel D is represented as having twice the diameter and twice the number of teeth as the wheel B. As soon as the connecting-rod is set in motion it carries the wheel D around the shaft A, and around the wheel B, and the shaft makes one revolution, owing to this motion of the crank; but the shaft makes, during the same revolution of the crank, two other revolutions, as the teeth of the small wheel, B, have to mesh into those of the large wheel, D, and as the wheel B must thus revolve twice in order to follow the wheel D, the shaft thus makes three revolutions during one of the crank, or, in other words, it makes as many more revolutions than one as the diameter of the shaft-wheel is contained in that of the wrist-wheel which here is $\frac{2}{1}$.

Figure 2:
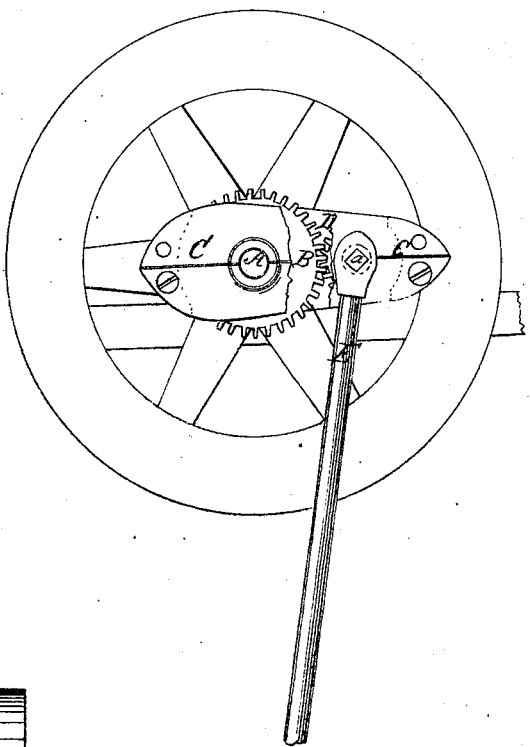
Figure 4:
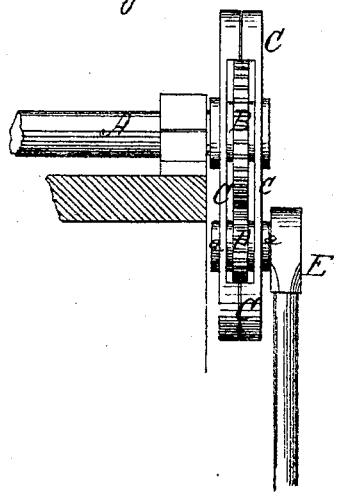

In figs. 2 and 4, the diameter of the wrist-wheel is represented as being half as long as that of the shaft-wheel. The above rule will also apply here, and it would follow that the shaft revolves one and a half time during each revolution of the crank. The wheels may, if desired, be wholly or partly encased, as shown. Suitable gear-wheels may be interposed between the wheels B and D, if desired, their axles being fitted to the plate C.

If desired, the plate C may be increased in size to receive five, more or less, wrist-wheels, revolving around the central shaft-wheel. I do not, therefore, confine myself to the use of two wheels simply.

Having thus described my invention, what I claim as new, and desire to secure by Letters Patent, is—

A crank, when composed of the gear-wheels B and D, or their equivalents, and of the plates C and pin $a$, all made substantially as described, and operating so that the velocity of the shaft is increased without increasing the number of revolutions of the crank.

E. SOPER.

Witnesses:
WM. F. MCNAMARA,
ALEX. F. ROBERTS.